Nov. 23, 1937.  C. L. STEPHENS  2,100,008
PICTURE PROJECTING DEVICE
Filed June 8, 1936
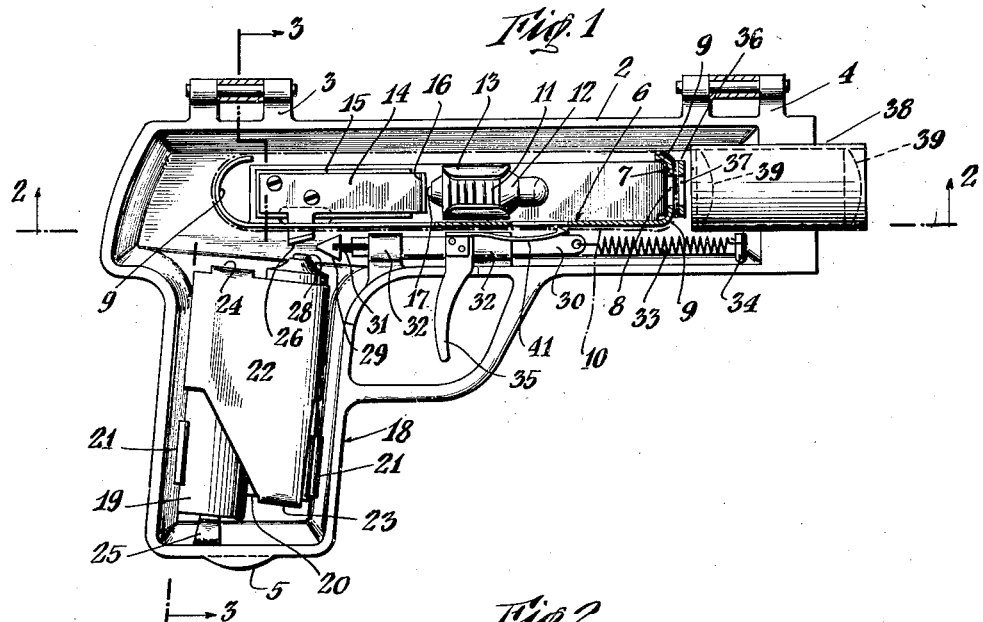
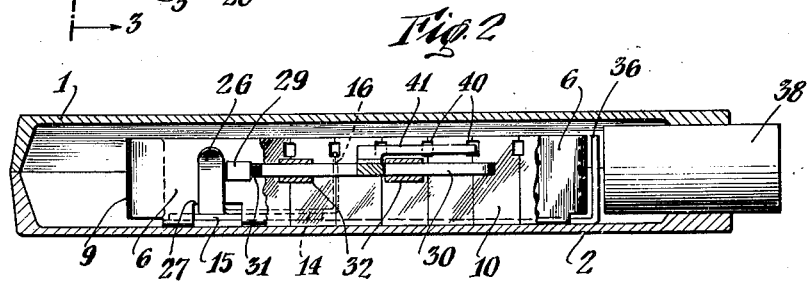
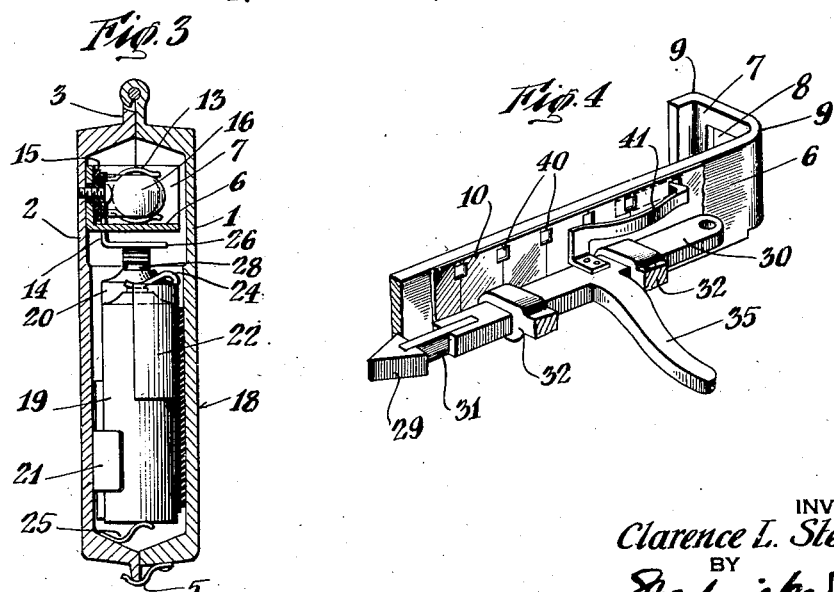
INVENTOR
Clarence L. Stephens
BY
Frederick Barker
ATTORNEY Patented Nov. 23, 1937

2,100,008

UNITED STATES PATENT OFFICE 2,100,008

PICTURE PROJECTING DEVICE

Clarence L. Stephens, Bayside, N. Y.

Application June 8, 1936, Serial No. 84,109

4 Claims. (Cl. 88—28)

This invention relates to devices adapted for the projection of successive pictures from a film strip for exposure on any suitable surface, and my improvements include the provision of means for creating and passing a light beam through an adjusted film portion and through lenses for projected picture enlargement, together with co-ordinated means for flashing the light beam when the film is advanced to a set position.

While not so limited, my improved device may have a holder in the form of a toy pistol whose trigger, in its operation includes means for stepping the film, in successive stages, into focus with the lenses, the trigger mechanism also including means for closing an electrical circuit to energize a bulb which provides the light beam.

Another feature of my invention consists in the employment of a light bulb having condensing means, to direct a light beam, without appreciable diffusion, upon the lens system, through the film picture, to thereby enable the projected enlargement to appear clearly and well defined.

Other features and advantages will hereinafter appear.

In the drawing:—

Figure 1 is a side sectional elevation of my improved projection device, in the form of a pistol.

Fig. 2 is a sectional plan view taken on the line 2—2 of Fig. 1.

Fig. 3 is a vertical, cross-section, taken on the line 3—3 of Fig. 1, and

Fig. 4 is a perspective view of the trigger mechanism and film guide.

As stated I am by way of example showing my improved projecting device in the form of a pistol and in the accompanying illustrations the numerals 1, 2 indicate respectively the opposite side members of the pistol frame, said members being shown hinged together at 3, 4 at the barrel top, and provided at the butt of the handle with spring catch engaging means 5.

Thus for loading and other purposes the members 1, 2 can be unlatched and swung apart. The hinges 3, 4 are elevated and aligned, to serve as a sighting means.

A guide member or plate 6 is fitted within the pistol barrel, said member being in the form of a flat strip having a forward, right angularly disposed, vertical portion 7 that is provided with a squared opening 8. Said member 6 has rounded forward corners and rear end 9, and a strip of film indicated at 10, and here shown in endless form, is fitted movably around said member.

The socket portion 11 of a light bulb 12 is held in a spring clip 13 that is secured to a side wall of the pistol. A contact strip 14, also secured to said wall, insulated therefrom by insulating strip 15, has a projecting spring finger 16 that bears against the contact end 17 of the light bulb when the latter is engaged by clip 13.

In the handle portion 18 of the pistol I provide means for removably holding two battery cells 19, 20, they being localized therein by a spring clip 21 that is secured to the handle wall. These cells are shown as placed in series relation by means of a conductive plate 22 having contact 23 to engage one pole of cell 20 and contact 24 to engage the opposite pole of the cell 19. With the pistol frame constituting the ground a circuit can be formed by providing a contact 25 between said frame and cell 19. To close the circuit for energizing the bulb means are provided for effecting contact between cell 20 and strip 14.

Thus, said strip 14 is shown as provided with a spring tongue 26 that extends through a slot 27 formed in plate 6, said tongue being disposed in opposed spaced relation with the terminal 28 of cell 20 in the circuit open position. But a conductive interponent or spear head 29 is adapted to be interposed between tongue 26 and terminal 28 to complete the circuit.

Said spear head is placed at one end of the bar 30. Thus bar 30 is slotted to receive one end of a piece of insulating material 31, and spear head 29, which is spaced from bar 30, is also slotted to receive the other end of said piece 31.

The bar 30 is slidable in guides 32 that are secured to the pistol frame, and said bar, at its end opposite the spear head, is connected by a spring 33 with the pistol frame, the spring engaging a stud 34 for that purpose.

A handle, in the form of a trigger 35 is adapted to shift bar 30, against the retractile tension of spring 33 to move spear head 29 into its circuit closing position. The operator holds bar 30 thus shifted during the period in which it is desired to energize the bulb.

The endless film 10, which is provided with a succession of pictures to be projected, and is movable around plate 6, passes between portion 7 of said plate and a fixed guide plate 36 that is provided with a squared orifice 37 in alignment with squared orifice 8.

A tube 38, having a lens system 39 is fitted and suitably secured in the muzzle portion of the pistol barrel, to be in advance of that portion of the film lying between the squared orifices 8, 37, so that the bulb which is positioned behind that portion of the film is adapted when energized, to direct its light beam through that film portion and the lens system and thereby to project a picture upon a more or less distant surface.

The film is provided on one margin with a series of equi-distant spaced holes 40, the spacing representing each of a series of pictures, and a spring pawl 41, carried by bar 30, is adapted to engage said holes for the purpose of shifting the film which each manual throw of said bar.

The guides 32 also serve as stops to limit the throw of bar 30, and the extent of the throw is adjusted to shift the film to bring pictures thereon in succession between the squared orifices 8, 37. In the structure disclosed the spear head 29, in the bar movement, reaches the contacts 26, 28 just when the travel of the film has brought a complete picture into projecting line, so that only a slight continuing movement of the bar results in the energizing of the bulb. By this means, with the setting of the picture and the sequential circuit closing, the operator, by holding the trigger may expose the picture for any desired period. Upon release of the trigger the spring 33 restores the bar position, but in this action the pawl 41, having a suitably shaped nose, slips out of engagement with the hole 40 by which it had shifted the film, and comes to rest in the next succeeding hole in readiness for another step movement of the film.

In the projection of pictures I have found it desirable to employ means for condensing the bulb light so that it may enter the lens system in the form of a beam. I therefore employ a type of bulb having a thickened forward portion which gives this condensing effect and combines, with the lens system, in the projection of well defined pictures.

While I have referred to my invention as comprising a projection device it may also be employed for exhibiting pictures carried by the film, the user in this instance applying an eye to the lens and seeing thereby a magnification of the pictures as they are advanced, with the light behind them.

Variations within the spirit and scope of my invention are equally comprehended by the foregoing disclosure.

I claim:—

1. Picture projecting means in the form of a two-part, hinged pistol having a handle and a barrel, a lens in said barrel, an endless film bearing a succession of pictures, and having marginal, equi-spaced holes, guide means for said film in said barrel, battery cells in said handle, a light bulb, a circuit therefor, a slidable bar, guides therefor mounted in said barrel, a trigger depending from said bar for its operation, said guides also serving as stops to limit the throw of said bar, spring means to hold said bar retracted, an insulated circuit closing interponent extended from said bar, a spring pawl also carried by said bar, said bar when moved by its trigger causing said pawl to engage a hole in said film and shift said film to bring a succeeding picture into line with said bulb and lens and then causing said interponent to close said circuit.

2. Picture projecting means comprising a holder, a lens carried thereby, an endless film bearing a succession of pictures and having marginal holes, a guide member for said film, a source of electrical energy, a light bulb, a circuit therefor, a slidable bar extending below said member, guides for said bar mounted in said holder, a trigger depending from said bar for its operation, said guides also serving as stops to limit the throw of said bar, spring means to hold said bar retracted, and a spring pawl also carried by said bar, said bar when moved by its trigger causing said pawl to engage a hole in said film and shift said film to bring a succeeding picture into line with said bulb and lens, and then causing said bar to close said circuit.

3. Picture projecting means comprising a holder, a lens carried thereby, an endless film bearing a succession of pictures and having marginal holes, guide means for said film, a source of electrical energy, a light bulb, a circuit therefor, a slidable bar, guides therefor mounted in said holder and also serving as stops to limit the throw of said bar, spring means to hold said bar retracted, an insulated circuit closing interponent extended from said bar, and a spring pawl also carried by said bar, the arrangement being such that when the bar is moved rearwardly said pawl engages a hole in said film to shift the same, bringing a succeeding picture into line with said bulb and lens, and then causing said interponent to close said circuit.

4. Picture projecting means in the form of a two-part, hinged pistol having a handle and a barrel, a lens in said barrel, an endless film bearing a succession of pictures and having marginal, equi-spaced holes, battery cells in said handle, a light bulb, a circuit therefor, film guide means in said barrel, said guide means presenting a forward vertically disposed portion having an opening aligned with said lens and bulb, a slidable bar, guides therefor mounted in said barrel, a trigger depending from said bar for its operation, said guides also serving as stops to limit the throw of said bar, spring means to hold said bar retracted, an insulated circuit closing interponent extended from said bar, a spring pawl also carried by said bar, said bar when moved by its trigger causing said pawl to engage a hole in said film and shift said film to expose a succeeding picture in said opening into line with said bulb and lens and then causing said interponent to close said circuit.

CLARENCE L. STEPHENS.